United States Patent [19]

Hirschkorn

[11] Patent Number: 4,983,113
[45] Date of Patent: Jan. 8, 1991

[54] EXTRUDER HEAD ASSEMBLY

[75] Inventor: Ingo Hirschkorn, Neu Wulmstorf, Fed. Rep. of Germany

[73] Assignee: Fried, Krupp Gesellschaft mit Beschränkter Haftung, Essen, Fed. Rep. of Germany

[21] Appl. No.: 434,462

[22] Filed: Nov. 13, 1989

[30] Foreign Application Priority Data

Nov. 17, 1988 [DE] Fed. Rep. of Germany ...... 3838877

[51] Int. Cl.$^5$ .............................................. B29C 47/08
[52] U.S. Cl. ..................................... 425/183; 425/185; 425/188; 425/190; 425/192 R; 425/382.3
[58] Field of Search ............ 425/182, 185, 188, 379.1, 425/382.3, 382.4, 183, 190, 192 R

[56] References Cited

U.S. PATENT DOCUMENTS

| | | |
|---|---|---|
| 3,902,835 | 9/1975 | Theysohn .............................. 425/380 |
| 3,947,202 | 3/1976 | Göller et al. ......................... 425/185 |
| 4,358,261 | 11/1982 | Ohki ................................... 425/192 R |
| 4,526,528 | 7/1985 | Kline et al. ......................... 425/382.3 |
| 4,652,225 | 3/1987 | Dehennau et al. ................... 425/188 |
| 4,666,387 | 5/1987 | Yokota et al. ....................... 425/182 |
| 4,698,006 | 10/1987 | Ralphs ................................. 425/185 |
| 4,781,563 | 11/1988 | Capelle ............................... 425/185 |

FOREIGN PATENT DOCUMENTS 3613071 10/1987 Fed. Rep. of Germany .
3629096 3/1988 Fed. Rep. of Germany .
3709248 7/1988 Fed. Rep. of Germany .

Primary Examiner—Jay H. Woo
Assistant Examiner—James P. Mackey
Attorney, Agent, or Firm—Spencer & Frank

[57] ABSTRACT

An extruder head assembly includes an extruder head having an abutment face and an internal flow channel terminating at the abutment face; first and second preforming dies and a preforming die drum removably accommodating the first and second preforming dies in a spaced relationship to one another. The drum is supported at the extruder head for rotation about an axis relative to the extruder head for selectively aligning one of the first and second preforming dies with the internal flow channel at the abutment face of the extruder head. Further, a releasable immobilizing mechanism is provided for pressing the drum against the abutment face, thereby placing the preforming die—aligned earlier with the flow channel—in an operative position.

7 Claims, 3 Drawing Sheets

EXTRUDER HEAD ASSEMBLY

BACKGROUND OF THE INVENTION

This invention relates to an extruder head combined with a preforming die which has a rear surface—as viewed in the direction of extrusion—that is urged into a face-to-face engagement with a support face (abutment face) forming part of the extruder head. The extruder head has at least one flow channel which terminates, open-ended, on the support face.

It is known to exchange a preforming die or an extruder final die in an extruder by displacement in its own longitudinal direction laterally into and out of a recess provided for this purpose in the extruder head. Such arrangements are disclosed, for example, in German Patent Document Nos. 3,629,096 and 3,709,248. Due to the substantial length of the preforming dies (up to 1200 mm), even at high feed rates it takes a significant time period until the preforming die to be replaced is pushed out of the region of the extruder head and a new preforming die is inserted. Since during such a replacement period, a significant amount of material would be extruded and lost, for preforming die replacements in prior art structures the extruder must be stopped. This, however, not only results in an immediate stoppage of production, but it also makes a new adjustment of the extrusion process necessary upon startup. Further, because of the non-stationary flow behavior during the starting phase, a considerable amount of the extruded profiled material is waste.

SUMMARY OF THE INVENTION

It is an object of the invention to provide an improved extruder head assembly with which the time for exchanging a preforming die is reduced considerably.

This object and others to become apparent as the specification progresses, are accomplished by the invention, according to which, briefly stated, the extruder head assembly comprises an extruder head having an abutment face and an internal flow channel terminating at the abutment face; first and second preforming dies and a preforming die drum removably accommodating the first and second preforming dies in a spaced relationship to one another. The drum is supported at the extruder head for rotation about an axis relative to the extruder head for selectively aligning one of the first and second preforming dies with the internal flow channel at the abutment face of the extruder head. Further, a releasable immobilizing mechanism is provided for pressing the drum against the abutment face, thereby placing the preforming die—aligned earlier with the flow channel—in an operative position.

The pivotability of the preforming die drum permits the preforming die to be replaced to be removed transversely to its length dimension, which requires only a relatively short period due to the relatively short path to be traversed. At the same time, a new preforming die is pivoted into position over a path of the same short length. Thus, the time required to exchange preforming dies is reduced to such an extent that the extruder generally need not be stopped. There will result but an insignificant amount of waste material, namely, the quantities extruded into the space between the two preforming dies during their pivotal motion in the course of the exchange process. The invention thus provides for an operative preforming die and, simultaneously, a standby preforming die, dependent on the angular position of the drum relative to the extruder head.

According to a further feature of the invention, the recesses for the preforming dies in the preforming die drum are offset at an angle of less than 90° relative to one another in order to even further reduce the length of the required pivot path and the exchange period resulting therefrom.

In order to securely position a preforming die inserted into the drum as a standby die and to reliably avoid a radial shift of the preforming dies during the motion of the drum, according to a further feature of the invention, the recesses in the preforming die drum are configured as undercut recesses.

According to another feature of the invention, the preforming die drum can be, as a whole, pivoted away from the extruder head for the purpose of cleaning the extruder head.

According to another feature of the invention, separate movement and pressing devices are provided to establish different conditions for the pivoting of the preforming dies and the operational readiness state.

According to a preferred embodiment, the contact faces of the extruder head and the corresponding rear face of the preforming die are cylindrical having identical radii. The preforming die drum is coaxial with the contact face of the extruder head and can thus be pivoted directly without additional linear movement, and for this purpose, it is merely required to reduce or remove the contact pressure between the preforming die drum and the extruder head.

According to another preferred embodiment, the contact face of the extruder head and the rear face of the preforming die are planar. For pivoting, the preforming die drum must be moved away from the extruder head to such an extent that the edges of the rear preforming die face can unimpededly move past the extruder head.

DESCRIPTION OF THE PREFERRED EMBODIMENTS

Figure 1:
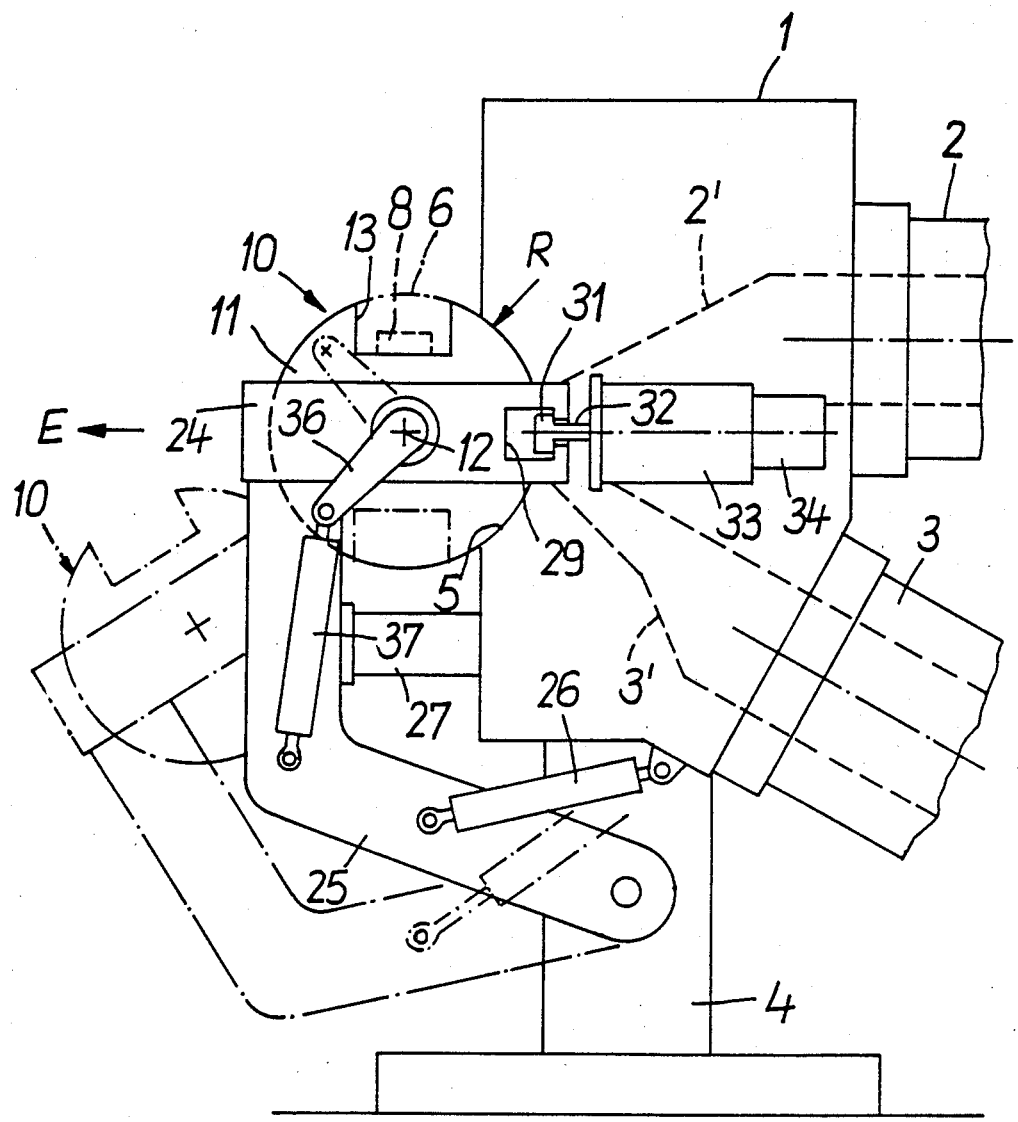
FIG. 1 is a schematic side elevational view of a preferred embodiment of the invention.
Figure 2:
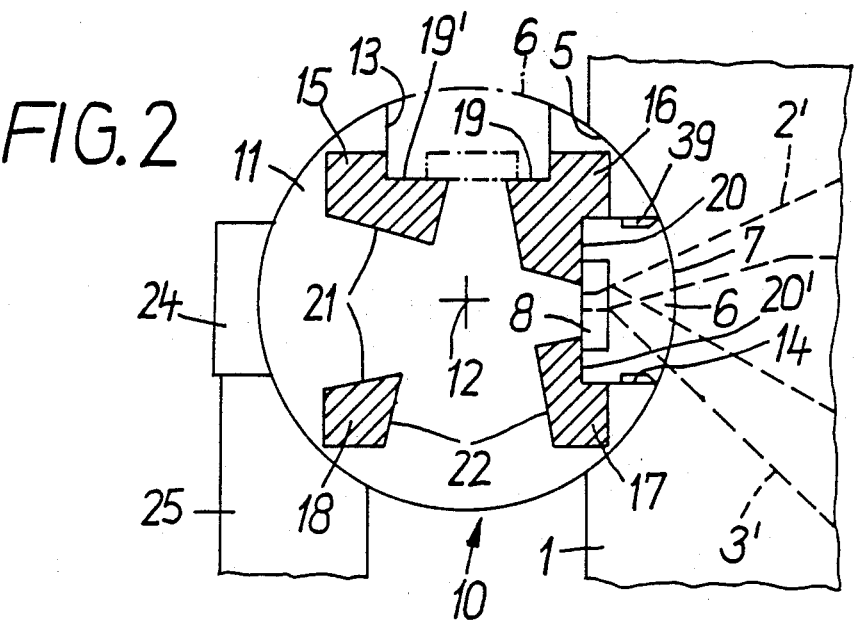
FIG. 2 is an enlarged schematic side elevational view of one part of the construction of FIG. 1.

Turning to FIGS. 1 and 2, the extruder head 1 shown therein is a duplex head connected to two extruders 2 and 3 and supported on a stand 4. The extruder head 1 has flow channels 2', 3' for guiding the material from the respective extruders 2, 3. Such an arrangement is conventional and is disclosed, for example, in German Patent Document No. 3,613,071.

The extruder head 1 has a cylindrical contact face or abutment face 5 over its entire width. In the operational readiness state of the extruder head, a preforming die or preform plate 6 is in engagement with the contact face 5. For this purpose, the preforming die 6 is provided with a rear cylindrical face 7—as viewed in the direction opposite the extrusion direction E—which has the same radius R as the contact face 5. The preforming die 6 is, together with a final die 8, seated in a preforming die drum 10.

The preforming die drum 10 is composed of two lateral, circular disks 11 (only one visible in FIGS. 1 and 2), each provided with two recesses 13 and 14 which extend parallel to the axis 12 of the preforming die drum 10 and are in alignment with one another. The axis 12 is spaced from the contact face 5 and is oriented generally parallel thereto. The radius of disks 11 is at least slightly less than that of contact face 5. The contour of the recesses 13, 14 corresponds to the cross section of the preforming die 6. Four webs 15, 16, 17, 18 are arranged between the disks 11. The webs 15, 16 and 17 which are adjacent a recess corner, have cutouts 19, 20, 19', 20' arranged flush with the recesses 13, 14. The webs 15, 16, 17, 18 form two inner passage openings 21 and 22 which widen in the extrusion direction and accommodate the shaped material to be extruded (not shown). For greater strength, the preforming die drum is preferably made of one piece.

The preforming die drum 10 is supported at opposite axial ends by a respective stub shaft (not shown) in a respective bearing body 24 disposed at the freely movable end of a respective lever 25 articulated to stand 4. Each lever 25 at the opposite axial ends of the drum 10 is movable by means of a respective pressurized cylinder 26 articulated to the extruder head 1 against a stop 27 disposed at the extruder head 1 or away therefrom, for example, for the purpose of opening and cleaning the extruder head. The latter position is shown in dash-dot lines in FIG. 1. The stop 27 is dimensioned in such a way that the preforming die drum 10 and preforming die 6 do not contact the face 5 with any appreciable pressure.

At its end facing the extruder head 1, the respective bearing body 24 is provided with an undercut recess 29 into which engages the hammer-shaped end 31 of the piston rod 32 of a respective hydraulic cylinder 33. Each hydraulic cylinder 33 has a turning mechanism 34 with the aid of which the associated piston rod 32 can be rotated 90°. The hammer-shaped end 31 of the piston rod 32, the passage opening including a cavity and a recess 29 and the turning mechanism 34 may have a construction as described, for example, in U.S. Pat. No. 4,824,353.

Externally of each bearing body 24, a respective lever 36 is mounted on the axial stub of the preforming die drum 10. The levers 36 are torque-transmittingly connected with the stubs, for example by means of a spline connection. The free ends of the levers 36 are connected with a respective pressure medium cylinder 37 articulated to the respective lever 25 at each axial end of the drum 10.

Figure 4:
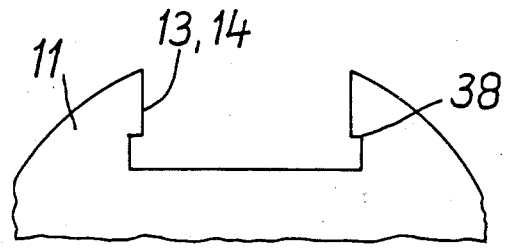
FIG. 4 is a schematic fragmentary side elevational view of another preferred embodiment.

In order to fix the preforming dies 6 radially in the preforming die drum 10 to thus secure them, for example, against centrifugal forces during pivoting, the recesses 13, 14 have an undercut portion 38 as shown in FIG. 4. As an alternative or in addition, the preforming die drum or the preforming dies may be provided with permanent magnets.

Instead of hydraulic cylinders 33 and the releasable coupling formed by the undercut recess 29 and the hammer-shaped end 31, other clamping systems may be used, for example, a pivotal clamping frame as disclosed in U.S. Pat. No. 3,902,835.

Instead of the pivotal levers 36, a toothed rod drive (not shown) acting on the preforming die drum 10 may be provided.

Figure 3:
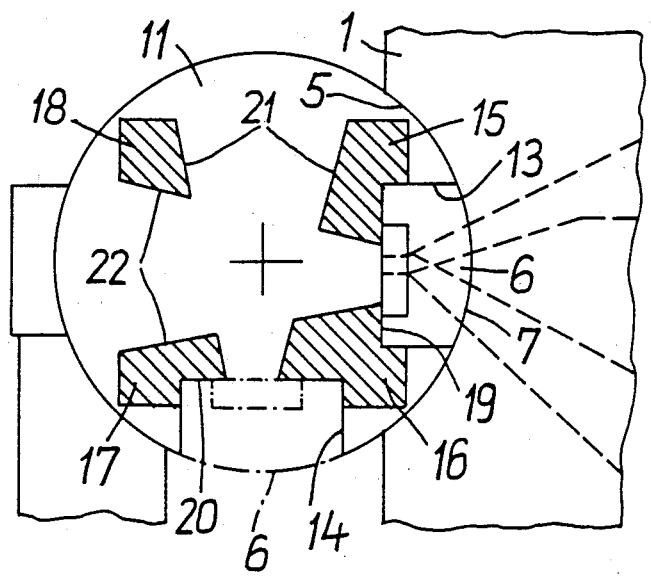
FIG. 3 is a schematic side elevational view illustrating the components of FIG. 2.

In order to ready the extruder head 1 for operation, a preforming die 6 including a final die 8 is inserted—while the preforming die drum 10 is in the position shown in FIG. 2—into the recess 13, 19, which is now at the top (standby position), and then the preforming die drum 10 is rotated about 90° by actuation of the power cylinders 37 so that the preforming die 6 is moved from the standby position into its operational position as shown in FIG. 3. Then the hammer-shaped end 31 of the piston rod 32 is introduced into the recess 29 of the bearing body 24 and, after having been rotated about 90° by the turning mechanism 34, the end 31 is retracted, thus pulling the preforming die 6 into a pressing engagement with the contact face 5 of the extruder head 1 with a predetermined pressure, possibly against the elastic resistance of the levers 25.

To prepare for an exchange of the preforming dies 6, a further, new preforming die is inserted into the free recess 14, 20 which is presently in the downwardly oriented standby position, as shown in FIG. 3. For the exchange proper of the preforming dies, the hydraulic cylinder 33 is de-energized to thus remove the pressing force exerted by the piston rod end 31 against the inner abutment face of the recess 29, so that the pressure on the preforming die to be replaced is removed, and even a small gap between the rear face 7 of the preforming die 6 and the contact face 5 may appear. Thereafter, by retracting the piston rods of the power cylinders 37, levers 36 are pivoted 90° counterclockwise from the dash-dot position shown in FIG. 1 into the solid-line position shown therein, so that the preforming die 6 to be replaced is swung upwardly away from the operational position into an upper standby position, while the new preforming die 6 is swung from a lower standby position upwardly into the operational position. The extrudate escaping during the exchange of the preforming dies is pushed by the new preforming die along the contact face 5 and can be removed later. For an accurate stripping, the preforming dies may have stripping blades 39.

During the exchange of the preforming dies the power cylinders 26 remain energized. Immediately after the exchange of the preforming dies, the hydraulic cylinder 33 is again charged with pressure so that the new preforming die 6 is pressed against the extruder head 1 with the required operating pressure. The previously used preforming die can be removed from the top of the preforming die drum 10 during operation and can be replaced by a new preforming die.

In order to open and clean the extruder head 1, the preforming die drum 10 is pivoted into the position shown in dash-dot lines in FIG. 1 by extending the piston rod of the pressure medium cylinders 26.

Figure 5:
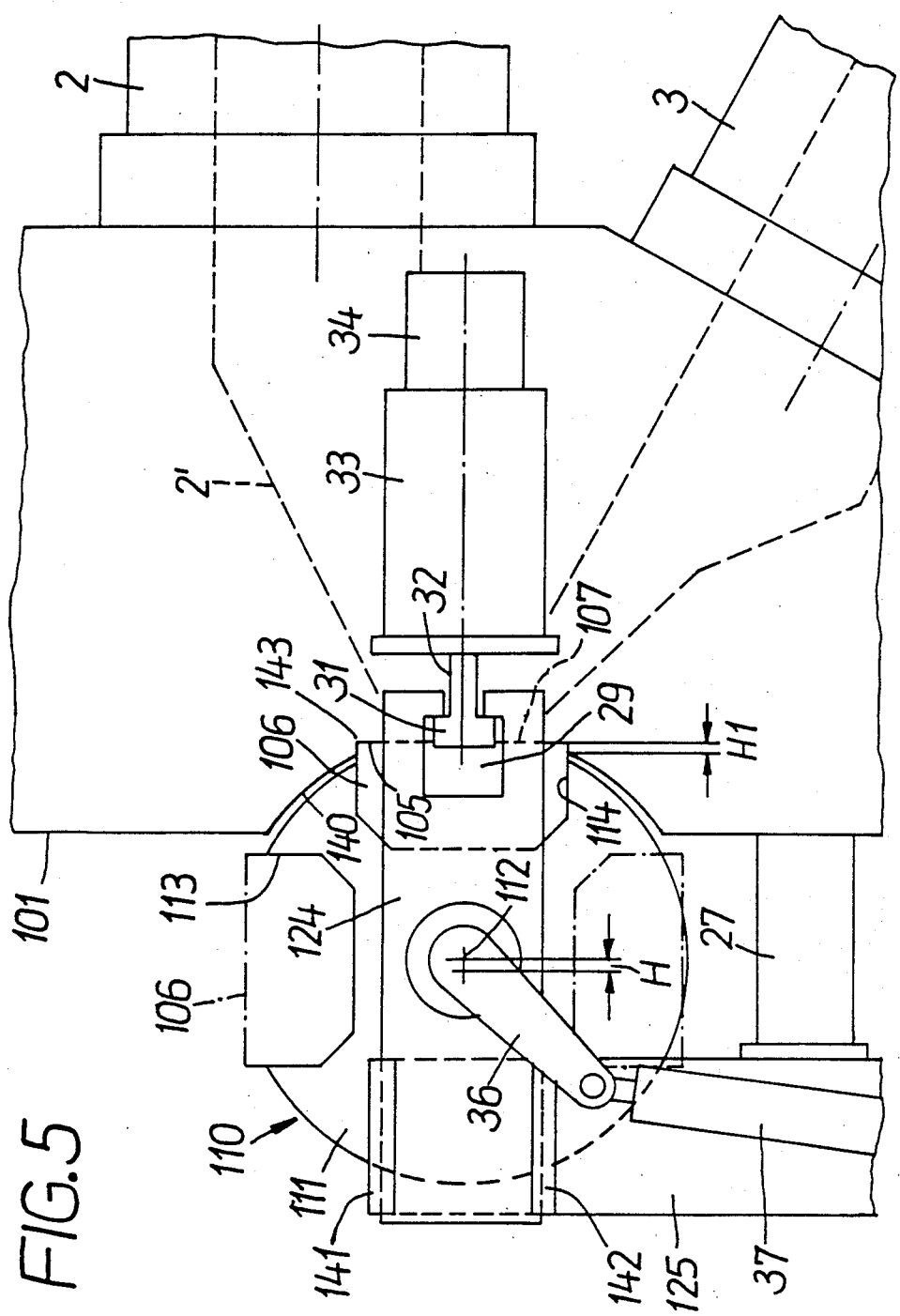
FIG. 5 is a schematic side elevational view of still a further embodiment of the invention.

Turning to FIG. 5, there is illustrated therein another preferred embodiment of the extruder head. The same components are given the same reference numerals and those components which are similar only in principle to those of the embodiment shown in FIGS. 1 to 4 are given a reference numeral raised by the number 100. In the embodiment shown in FIG. 5, the extruder head 101 has a planar contact face (abutment face) 105 which, compared to the remainder of recess 140 of the extruder head 101, is sunk by a distance Hl. Correspondingly, the rear face 107 of the preforming die 106 is likewise planar. A bearing body 124 is slidable perpendicularly to the contact face 105 in a guide 141, 142 mounted on the lever 125. Such a sliding motion may take place when the lever 125 abuts the stop 27. The bearing body 124 is movable by the hydraulic cylinder 33.

For an exchange of the preforming dies 106, the bearing body 124 is first moved away from the extruder head 101 by a stroke H which is at least equal to the distance Hl. During this occurrence, the edges 143 of the rear face 107 of the preforming die 106 move unimpededly past the contact face 105 and the remainder of the recess 140. After pivoting the preforming die drum 110, the bearing body 124 is retracted by the hydraulic cylinder 33 and the preforming die drum 110 is, with the new preforming die 106, pressed against the extruder head 101.

It will be understood that the above description of the present invention is susceptible to various modifications, changes and adaptations, and the same are intended to be comprehended within the meaning and range of equivalents of the appended claims.

What is claimed is:

1. An extruder head assembly comprising
   (a) an extruder head having an abutment face and an internal flow channel terminating at the abutment face;
   (b) first and second preforming dies;
   (c) a preforming die drum having receiving means for removably accommodating the first and second preforming dies in a spaced relationship to one another;
   (d) means for supporting the drum at said extruder head for rotation about an axis relative to said extruder head for selectively aligning one of the first and second preforming dies with the internal flow channel at said abutment face; said axis being spaced from said abutment face and being generally parallel thereto; and
   (e) releasable immobilizing means having a clamping state for pressing the drum against said abutment face thereby placing said one of the first and second preforming dies in an operative position.

2. An extruder head assembly as defined in claim 1, wherein said receiving means comprises two recesses situated less than 90° apart as related to said axis.

3. An extruder head assembly as defined in claim 1, wherein said receiving means comprises two recesses each having an undercut portion.

4. An extruder head assembly as defined in claim 1, further comprising a lever having a pivotally held first end and a second end carrying said means for supporting said drum; said lever having a first pivotal position in which said drum adjoins said extruder head and a second pivotal position in which said drum is remote from said extruder head.

5. An extruder head assembly as defined in claim 4, further comprising a power means for pivoting said lever into said first and second pivotal positions; said power means being separate from said releasable immobilizing means.

6. An extruder head assembly as defined in claim 1, wherein said abutment face is a concave cylindrical abutment face; further wherein said drum has a convex cylindrical outer surface being in a face-to-face engagement with the concave cylindrical abutment face in the clamping state of the releasable immobilizing means; said convex cylindrical outer surface and said concave cylindrical abutment face having identical radii.

7. An extruder head assembly as defined in claim 4, wherein said abutment face is planar; further wherein said drum has a planar outer surface being in a face-to-face engagement with the planar abutment face in the clamping state of the releasable immobilizing means; further comprising means allowing a linear motion of said drum perpendicularly to said planar abutment face and a recess provided in said extruder head for allowing unimpeded passage of said drum upon pivotal motion of said lever.

* * * * *